(12) United States Patent
Knox et al.

(10) Patent No.: US 11,657,692 B1
(45) Date of Patent: May 23, 2023

(54) SMOKE DETECTOR

(71) Applicant: Honeywell International Inc., Charlotte, NC (US)

(72) Inventors: Ronald Knox, Mount Eliza (AU); Bhanusri Yellapragada, Mount Waverley (AU)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 17/513,194

(22) Filed: Oct. 28, 2021

(51) Int. Cl.
*G08B 17/107* (2006.01)
*G01S 7/481* (2006.01)

(52) U.S. Cl.
CPC .......... *G08B 17/107* (2013.01); *G01S 7/4811* (2013.01)

(58) Field of Classification Search
CPC .................................................... G08B 17/107
See application file for complete search history.

(56) References Cited

U.S. PATENT DOCUMENTS

| 4,719,360 | A | * | 1/1988 | Kontani | ............... G01N 21/534 356/438 |
| 4,896,031 | A | | 1/1990 | Pettersson et al. | |
| 7,164,468 | B2 | | 1/2007 | Correia et al. | |
| 8,587,442 | B2 | | 11/2013 | Loepfe et al. | |
| 8,994,942 | B2 | | 3/2015 | Vollenweider | |
| 10,132,611 | B2 | | 11/2018 | Steffey et al. | |
| 10,379,540 | B2 | | 8/2019 | Droz et al. | |
| 10,545,240 | B2 | | 1/2020 | Campbell et al. | |
| 10,670,719 | B2 | | 6/2020 | Wang et al. | |
| 10,908,264 | B2 | | 2/2021 | O'Keeffe | |
| 2010/0194574 | A1 | | 8/2010 | Monk et al. | |
| 2013/0054187 | A1 | | 2/2013 | Pochiraju et al. | |
| 2017/0200358 | A1 | * | 7/2017 | Fang | .................... G08B 17/103 |
| 2017/0248699 | A1 | * | 8/2017 | Fang | .................... G08B 17/12 |
| 2020/0056973 | A1 | | 2/2020 | Knox et al. | |
| 2020/0158832 | A1 | | 5/2020 | Kirillov | |
| 2021/0215801 | A1 | | 7/2021 | Reppich et al. | |

FOREIGN PATENT DOCUMENTS

| AU | 2014271245 A1 | 1/2015 |
| DE | 102013204962 A1 | 10/2014 |
| DE | 102018214209 | 2/2020 |
| EP | 2093734 | 6/2011 |
| KR | 10-2182719 | 11/2020 |
| WO | 2021019308 | 2/2021 |

* cited by examiner

*Primary Examiner* — Travis R Runnings
(74) *Attorney, Agent, or Firm* — Brooks, Cameron & Huebsch, PLLC

(57) ABSTRACT

A smoke detector, and methods of operating a smoke detector, are described herein. In some examples, one or more embodiments include a laser emitter configured to emit a laser beam that illuminates an object in an area, a light receiver configured to receive light reflected from the illuminated object, and a controller configured to determine, based on the light reflected from the illuminated object, an amount of space in the area that is blocked from a field of view of the smoke detector by the object, and provide an indication responsive to the determined amount of space being above a threshold amount of space.

19 Claims, 4 Drawing Sheets

SMOKE DETECTOR

TECHNICAL FIELD

The present disclosure relates to a smoke detector, and methods of operating a smoke detector.

BACKGROUND

Smoke detectors can be implemented in indoor environments (e.g., buildings) or outdoor environments to detect smoke. For instance, a smoke detector can be mounted at a point in a room of a building to detect smoke in the room. Smoke detection can minimize risk by alerting users and/or components of a fire control system of a fire event occurring in the environment.

A Light Detection and Ranging (LiDAR) smoke detector is an example of a smoke detector. A LiDAR smoke detector can utilize optical systems, such as laser beam emitters and light receivers, to detect smoke in an environment.

DETAILED DESCRIPTION

Figure 1:
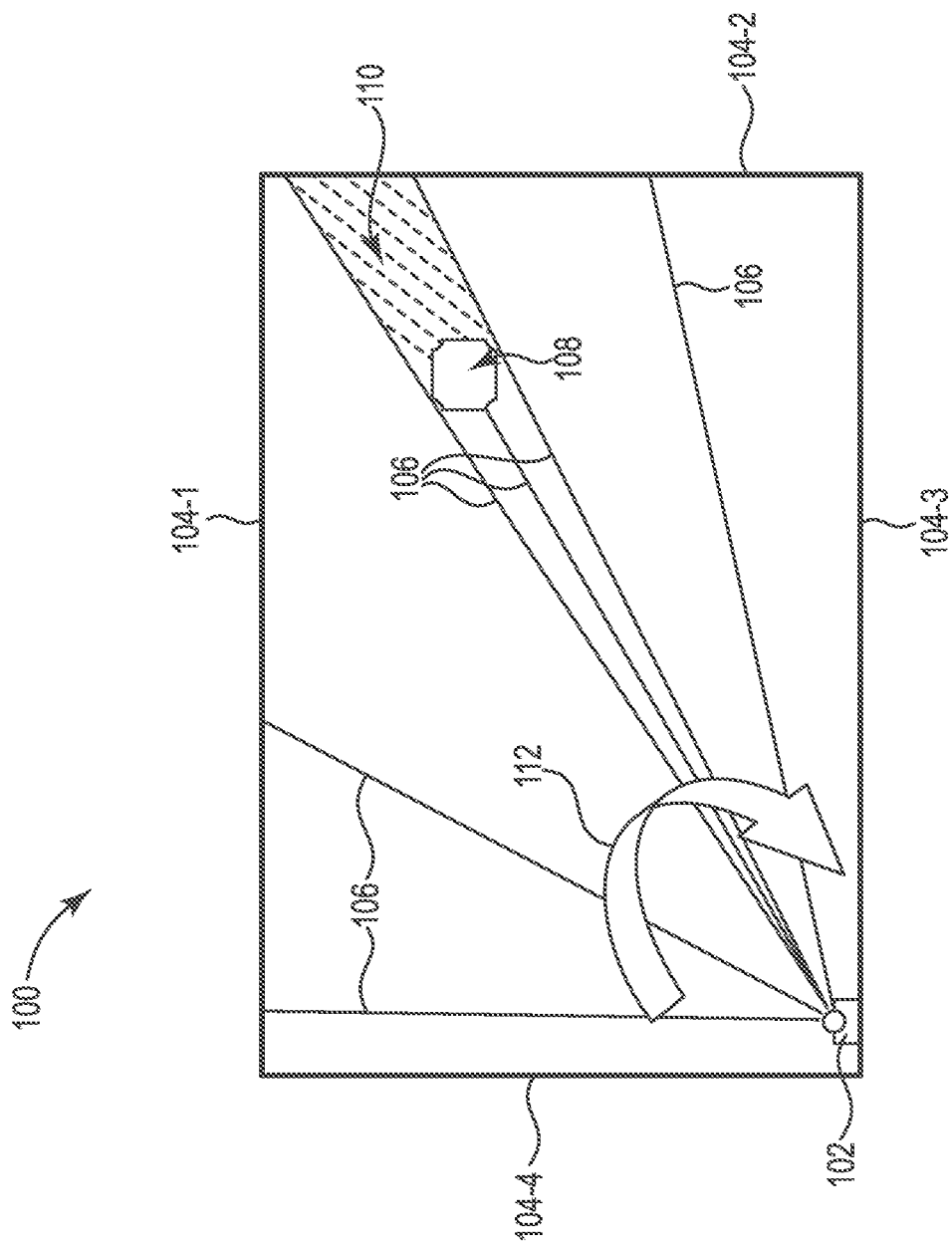
FIG. 1 is a top view of an area that includes a smoke detector in accordance with one or more embodiments of the present disclosure.

A smoke detector, and methods of operating a smoke detector, are described herein. In some examples, one or more embodiments include a laser emitter configured to emit a laser beam that illuminates an object in an area, a light receiver configured to receive light reflected from the illuminated object, and a controller configured to determine, based on the light reflected from the illuminated object, an amount of space in the area that is blocked from a field of view of the smoke detector by the object, and provide an indication responsive to the determined amount of space being above a threshold amount of space.

Smoke detectors may use laser beam emitters in conjunction with light receivers to detect smoke. For example, a smoke detector may use Light Detection and Ranging (LiDAR) technology to detect smoke. For instance, when a laser beam is emitted in an indoor environment, it may encounter a substance or material and light may be reflected and/or scattered to the light receiver. If no substance or material is present in the path of the laser, the light will instead reflect and/or scatter off a wall of the indoor environment and back to the light receiver. The smoke detector can determine the difference between a received light signal that has been reflected and/or scattered off a wall or light reflected off another substance or material, because the intensity of the received light signal will be considerably greater if it has been reflected and/or scattered off a wall as opposed to reflecting and/or scattering off a substance such as smoke. Additionally, a light signal that has passed through smoke will be slightly attenuated.

As such, by rotating a laser beam emitter and light receiver of a smoke detector and emitting pulses of light from the laser beam emitter, an indoor environment can be scanned to detect smoke. For example, the smoke detector may be positioned in a corner of an area (e.g., a room) and rotated from zero to ninety degrees to scan the entire room for smoke. By recording the alignment, position, and orientation of the smoke detection system at the time that the smoke is detected, the approximate location of the smoke in the room can also be determined.

In some instances, however, the indoor environment (e.g., room) may include additional fixed features (e.g., objects), such as, for instance, pillars, lighting features (e.g., fixtures), signs, and/or ladders, among others, that may also reflect and/or scatter the light from the emitted laser beam. Such objects may act to partially obstruct (e.g., block) the field of view of the smoke detector, and thus may prevent the detector from being able to detect smoke in the space (e.g., portion) of the room blocked by the object. Depending on the size of the object blocking the detector, and/or the position of the object in the room relative to the detector, the amount of space in the room in which smoke would be unable to be detected by the detector may exceed the amount allowed by the smoke detector operational requirements and/or fire codes of the local jurisdiction.

A smoke detector in accordance with the present disclosure, however, can identify such obstructions, and determine whether such obstructions would result in a violation of the applicable smoke detector operational requirements and/or fire codes. As such, during commissioning (e.g., installation) of the smoke detector, the installer can quickly determine whether the installation of the detector is successful, or whether the detector needs to be moved to a different location in the room. Further, after the smoke detector has been successfully commissioned and is in operation, the detector can continue to identify the presence of any newly introduced obstructions, determine whether they would result in a violation, and provide an indication (e.g., notification) of any violation to the building supervisor or other appropriate party.

Further, in order for a rotating smoke detector (e.g., a smoke detector with a rotating laser beam emitter and light receiver) to effectively detect smoke, the laser beam needs to be maintained on the smoke for a sufficient amount of time (e.g., the dwell time) for the detector (e.g., the light receiver of the detector) to make a valid measurement. As such, the scan of the room can not be too quick. However, the full scan of the entire room needs to be completed by the detector in as short of a time as possible in order to ensure that smoke that is present in any portion of the room can be detected in a timely manner (e.g., within 60 seconds), as may be required by the smoke detector operational requirements and/or fire codes of the local jurisdiction.

A smoke detector in accordance with the present disclosure, however, can reduce (e.g., minimize) its total scan time, while still maintaining a sufficient dwell time, by adjusting its rotation speed based on the different portions of the room it is scanning. For example, the intensity of the light signal received by the light receiver from a smoke plume or wall of the room, and therefore the dwell time of the smoke detector, is inversely proportional to the square of the distance between the light receiver and the smoke plume or wall. As such, the smoke detector can determine which walls of the room are closer to the detector and which walls of the room are further away from the detector, and adjust its rotation speed such that its rotation speed (e.g., scan) is quicker for portions of the room in which the wall is closer to the detector and slower for portions of the room in which the wall is further away from the detector.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2.

As used herein, "a", "an", or "a number of" something can refer to one or more such things, while "a plurality of" something can refer to more than one such things. For example, "a number of components" can refer to one or more components, while "a plurality of components" can refer to more than one component.

FIG. 1 is a top view of an area 100 that includes a smoke detector 102 in accordance with one or more embodiments of the present disclosure. Smoke detector 102 can be, for example, a Light Detection and Ranging (LiDAR) smoke detector, as will be further described herein. Area 100 can be an area of an indoor environment. For instance, area 100 can be a room of a facility (e.g., a building).

Smoke detector 102 can be part of (e.g., a component of) a fire control system of the facility. As described herein, a fire control system may be any system designed to detect and/or provide a notification of fire events occurring in a facility. For example, a fire control system may include smoke detection apparatuses and/or devices (e.g., detector 102) that can sense a fire occurring in the facility, alarms (e.g., speakers, strobes, etc.) that can provide a notification of the fire to the occupants of the facility, fans and/or dampers that can perform smoke control operations (e.g., pressurizing, purging, exhausting, etc.) during the fire, and/or sprinklers that can provide water to extinguish the fire, among other components. A fire control system may also include a control unit such as a physical fire control panel (e.g., box) installed in the facility that can be used by a user to directly control the operation of the components of the fire control system. In some embodiments, the fire control system can include a non-physical control unit or a control unit located remotely from the facility.

As shown in FIG. 1, area 100 includes a plurality of walls: a first (e.g., north) wall 104-1, a second (e.g., east) wall 104-2, a third (e.g., south) wall 104-3, and a fourth (e.g., west) wall 104-4. It is noted that embodiments of the present disclosure are not limited to the layout or the shape of area 100 illustrated in FIG. 1.

As shown in FIG. 1, smoke detector 102 (e.g., a laser emitter of smoke detector 102, as will be further described herein) can emit a beam (e.g., a laser beam) 106 across area 100. As used herein, the terms "light" or "beam" can include any type of light beam, such as a laser. These terms can also include pulses of light. For example, beam 106 can be a pulsed laser beam (e.g., comprise a plurality of pulses).

Smoke detector 102 can rotate beam 106 (e.g., a rotation mechanism of smoke detector 102 can rotate the laser emitter of smoke detector 102, as will be further described herein), such that beam 106 periodically scans across area 100 and illuminates different portions of area 100 (e.g., different portions of the walls of the room), as represented by arrow 112 illustrated in FIG. 1. A "scan" of the beam 106 can refer to a rotation of the beam such that the beam begins at an initial angular position and ends at a terminal angular position. As an example, a scan can include the beam moving from an angle substantially parallel to, or past substantially parallel to, wall 104-4 (e.g., from an angle of 90 degrees or greater than 90 degrees) to, or past, an angle substantially parallel to wall 104-3 (e.g., to or past an angle of 0 degrees), and a subsequent scan can include the beam moving from the angle substantially parallel to, or past substantially parallel to, wall 104-3 back to the angle substantially parallel to, or past substantially parallel to, wall 104-4.

As shown in FIG. 1, area 100 can include an object 108. Object 108 can be a fixed object, such as, for instance, a pillar, lighting feature (e.g., fixture), sign, or ladder, among other examples. Beam 106 can illuminate object 108, as illustrated in FIG. 1. However, object 108 may partially obstruct (e.g., block) the field of view of smoke detector 102. For instance, object 108 may prevent smoke detector 102 from being able to monitor, and detect smoke in, space 110 of area 100 illustrated in FIG. 1.

Smoke detector 102 (e.g., a light receiver of smoke detector 102, as will be further described herein) can receive light reflected from illuminated object 108 and light reflected from the illuminated different portions (e.g., the illuminated portions of walls 104-1 and 104-2) of area 100 as beam 106 scans across area 100. As used herein, the term "reflected" may be used to refer to light that is not only reflected but may be reflected and/or scattered. For example, the light may be reflected off a surface at an angle of incidence equaling the angle of reflection. Light that is incident on a surface or material can also be scattered in a multitude of directions in accordance with embodiments of the present disclosure.

Based on the light reflected from illuminated object 108, smoke detector 102 (e.g., a controller of smoke detector 102, as will be further described herein) can determine the amount (e.g., size) of space 110 that is blocked from the field of view of smoke detector 102 by object 108. For instance, smoke detector 102 can measure and/or analyze the intensity of the light reflected from illuminated object 108 to determine the size of space 110. Smoke detector 102 can make the determination of the size of space 110 automatically (e.g., without input from a user), or responsive to input from a user, such as the installer of smoke detector 102.

For example, smoke detector 102 (e.g., the controller of smoke detector 102) can determine the shape (e.g., the outline shape) of area 100 based on the light (e.g., the intensity of the light) reflected from the illuminated different portions of area 100, and the location (e.g., the radial coordinates) of object 108 in area 100 based on the light (e.g., the intensity of the light) reflected from illuminated object 108. Smoke detector 102 can then determine (e.g., calculate) the size of space 110 based on the determined shape of area 100 and the determined location of object 108 in area 100. Smoke detector 102 can determine the location of object 108 in area 100 based on the alignment of smoke detector 102 (e.g., the alignment of the laser emitter of the detector) when emitting the beam 106 (e.g., the laser pulse) that illuminates object 108, and the amount of time for smoke detector 102 to receive the light reflected from illuminated object 108 (e.g., the time of flight of the laser pulse that illuminates object 108).

Smoke detector 102 (e.g., the controller of smoke detector 102) can determine whether the amount (e.g., size) of space 110 that is blocked from the field of view of smoke detector 102 by object 108 is above a threshold amount of space (e.g., a threshold size). The threshold amount of space can be pre-defined, or set by a user (e.g., the installer) of smoke detector 102, and can be determined (e.g., defined or set) based on the smoke detector operational requirements and/or fire codes of the local jurisdiction of area 100. For instance, the threshold amount of space can be the maximum amount of unmonitored space allowed in area 100 by the smoke detector operational requirements and/or fire codes of the local jurisdiction.

Smoke detector 102 (e.g., the controller of smoke detector 102) can provide an indication (e.g., trigger an alert and/or fault condition) responsive to determining the size of space 110 is above the threshold amount of space. For example, smoke detector 102 can provide the indication to an additional device, such as, for instance, a mobile device or other computing device of the installer and/or a supervisor of the facility, via a text message or the internet or other network associated with the fire control system of area 100. In some embodiments, smoke detector 102 can also provide (e.g., to the additional device) a different indication, such as, for instance, an authorization and/or approval, responsive to determining the size of space 110 is not above the threshold amount of space.

Although not shown in FIG. 1 for simplicity and so as not to obscure embodiments of the present disclosure, in some instances area 100 may include an additional object that may block the field of view of smoke detector 102. For instance, the additional object may be a new object that is introduced to area 100 after smoke detector 102 has been commissioned and/or installed. In such an instance, beam 106 can illuminate the additional object, and smoke detector 102 can receive the light reflected from the illuminated additional object, determine the amount of space in area 100 that is blocked from its field of view by the additional object based on the reflected light, and provide an indication responsive to the determined amount of space being above the threshold amount of space, in a manner analogous to that described for object 108.

Figure 2:
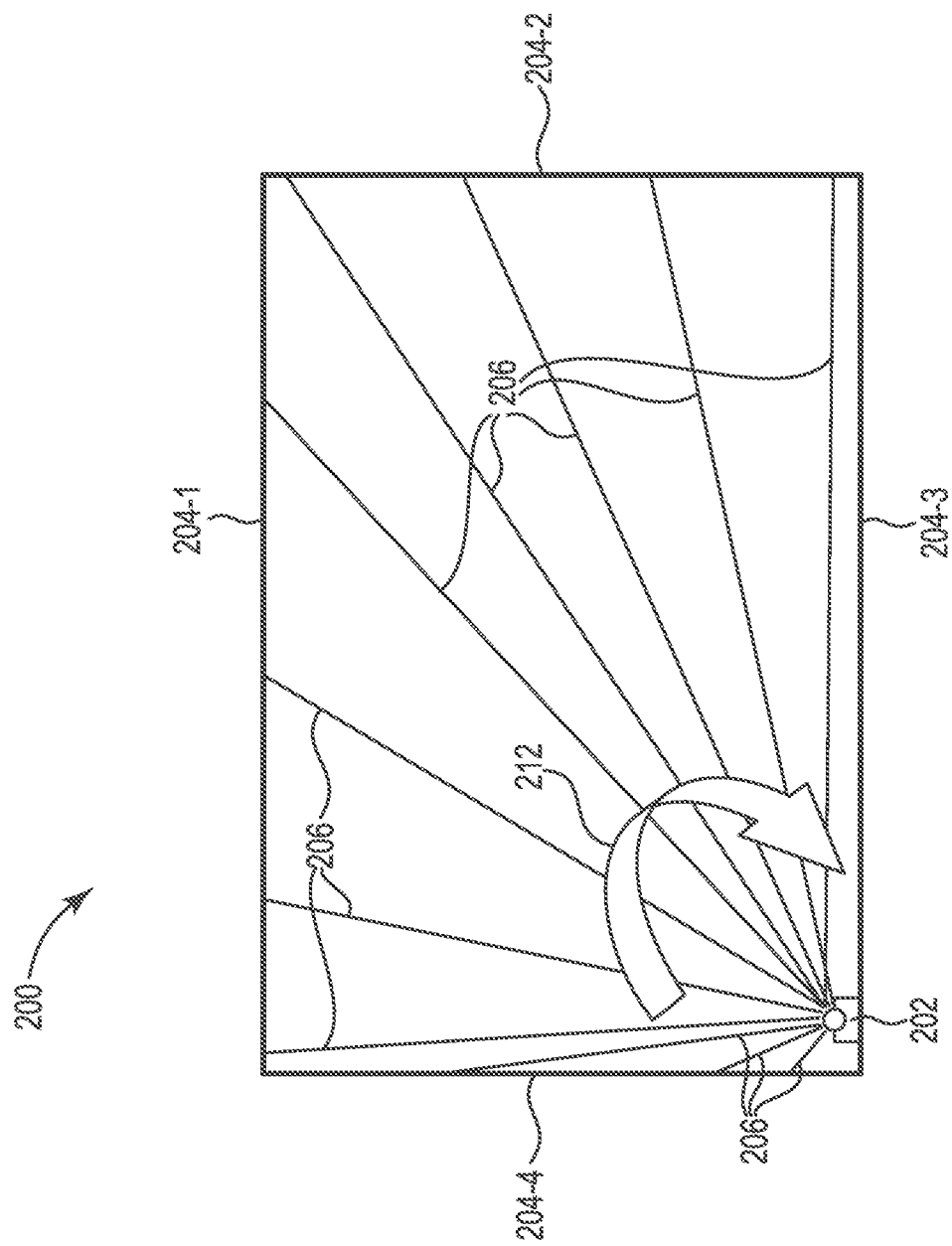
FIG. 2 is a top view of an area that includes a smoke detector in accordance with one or more embodiments of the present disclosure.

FIG. 2 is a top view of an area 200 that includes a smoke detector 202 in accordance with one or more embodiments of the present disclosure. Smoke detector 202 and area 200 can be, for example, analogous to smoke detector 102 and area 200, respectively, previously described in connection with FIG. 1. For example, smoke detector 202 can be part of a fire control system of a facility that includes area 200, and area 200 can include a plurality of walls 204-1, 204-2, 204-3, 204-4 analogous to walls 104-1, 104-2, 104-3, 104-4, respectively, described in connection with FIG. 1.

Further, smoke detector 202 can emit a beam 206 across area 200, and rotate beam 206 such that beam 206 periodically scans across area 200 and illuminates different portions of area 200, as represented by arrow 212, in a manner analogous to that previously described in connection with FIG. 1. Smoke detector 202 can receive light reflected from the illuminated different portions (e.g., the illuminated portions of walls 204-4, 204-1 and 204-2) of area 200 as beam 206 scans across area 200, in a manner analogous to that previously described in connection with FIG. 1.

Based on the light reflected from the illuminated different portions of area 200, smoke detector 202 (e.g., the controller of smoke detector 202) can adjust the speed at which beam 206 rotates (e.g., the speed at which the rotation mechanism of the detector rotates the laser emitter of the detector). For instance, smoke detector 202 can measure and/or analyze the intensity of the light reflected from the illuminated different portions of area 200 to determine the adjustment to the speed at which beam 206 rotates.

For example, smoke detector 202 (e.g., the controller of smoke detector 202) can determine the distance of each of the different portions of area 200 (e.g., the illuminated portions of walls 204-4, 204-1 and 204-2) from smoke detector 202 based on the light reflected from the illuminated different portions of area 200 (e.g., the greater the intensity of the light reflected from a portion of area 200, the shorter the distance of that portion of area 200 from the detector), and adjust the speed at which beam 206 rotates based on these determined distances. For instance, smoke detector 202 can adjust the speed at which beam 206 rotates such that the amount of time for which beam 206 illuminates each respective different portion of area 200 is directly proportional to the determined distance of that respective portion from smoke detector 202. As such, the rotation speed of beam 206 can be quicker through those portions of area 200 that are closer to smoke detector 202 and slower through those portions of area 200 that are further away from smoke detector 202.

In such a manner (e.g., by adjusting the rotational speed of beam 206), smoke detector 202 can adjust the amount of time for which beam 206 illuminates (e.g., the dwell time for) each respective different portion of area 200. For example, smoke detector 202 can adjust the rotational speed of beam 206 through the different portions of area 200 such that the beam rotates through each respective portion of area 200 at a speed sufficient (e.g., slow enough) to detect smoke in that respective portion, but also sufficient to illuminate each of the different portions of area 200 (e.g., fast enough to complete the scan of area 200) within a particular amount of time. The particular amount of time can be pre-defined, or set by a user (e.g., the installer) of smoke detector 202, and can be determined (e.g., defined or set) based on the smoke detector operational requirements and/or fire codes of the local jurisdiction of area 200. For instance, the particular amount of time can be the maximum amount of time allowed to complete the scan of area 200 by the smoke detector operational requirements and/or fire codes of the local jurisdiction. As an example, the particular amount of time can be 60 seconds.

Figure 3:
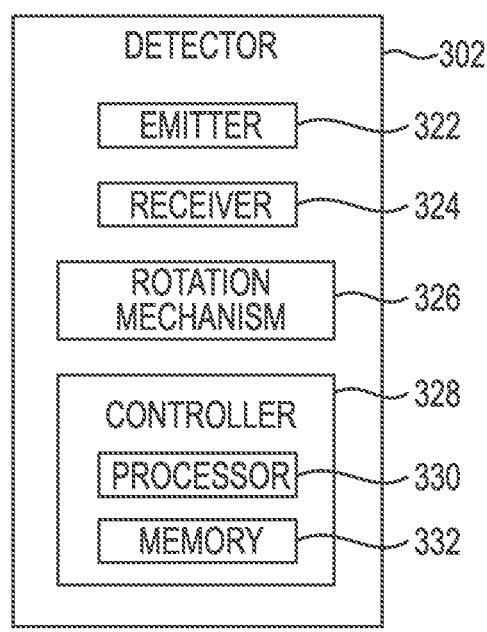
FIG. 3 is a block diagram of a smoke detector in accordance with one or more embodiments of the present disclosure.

FIG. 3 is a block diagram of a smoke detector 302 in accordance with one or more embodiments of the present disclosure. Smoke detector 302 can be, for example, smoke detector 102 and/or 202 previously described in connection with FIGS. 1 and 2, respectively.

As shown in FIG. 3, smoke detector 302 can include a laser emitter 322. Laser emitter 322 can be any device, system, or apparatus configured to emit light, such as a laser beam. For example, laser emitter 322 can emit a laser beam that illuminates an object in an area and/or different portions of the area, as previously described herein. The light emitted can be pulses, such as pulses of lasers. In some embodiments, laser emitter 322 can be LiDAR transmitter. In some embodiments, laser emitter 322 can be a laser diode.

As shown in FIG. 3, smoke detector 302 can include a light receiver 324. Light receiver 324 can be or include a sensor, detector, lens, or combination thereof configured to receive light and/or to convert light into a form that is readable by an instrument. For example, light receiver 324 can receive light reflected from an illuminated object in an area and/or illuminated portions of the area, as previously described herein. In some embodiments, light receiver 324 can be a LiDAR receiver or an electro-optical sensor. In some embodiments, light receiver 324 can include a clock and/or processing resources. The light receiver 324 can be configured to measure the time taken for a pulse of light to travel from laser emitter 322, reflect and/or scatter off an object, substance, or material, and travel back to the light receiver.

As shown in FIG. 3, smoke detector 302 can include a rotation mechanism 326 that can rotate laser emitter 322. For example, rotation mechanism 326 can rotate laser emitter 322 such that the laser beam emitted by laser emitter 322 periodically scans across an area to illuminate different portions of the area, as previously described herein. Rotation mechanism 326 can be mechanical and/or electrical. It may be configured to rotate the laser emitter 322 at a particular speed and/or over a given range. For example, if smoke detector 302 is positioned in a corner of an area (e.g., room), rotation mechanism 326 may alternately rotate laser emitter 322 from 0 degrees to 90 degrees and from 90 degrees to 0 degrees. As such, if the laser emitter 322 emits pulses periodically while being rotated by rotation mechanism 326, smoke detector 302 can scan the entire area for smoke. In some embodiments, rotation mechanism 326 can rotates the light receiver 324 and the laser emitter 322 together. For instance, rotation mechanism 326 can be a rotary platform or table driven by a motor.

As shown in FIG. 3, smoke detector 302 can include a controller 328 having a processor 330 and a memory 332. Memory 332 can be any type of storage medium that can be accessed by processor 330 to perform various examples of the present disclosure. For example, memory 332 can be a non-transitory computer readable medium having computer readable instructions (e.g., computer program instructions) stored thereon that are executable by processor 330 to operate smoke detector 302 in accordance with the present disclosure. That is, processor 330 can execute the executable instructions stored in memory 332 to operate smoke detector 302 in accordance with the present disclosure.

Memory 332 can be volatile or nonvolatile memory. Memory 332 can also be removable (e.g., portable) memory, or non-removable (e.g., internal) memory. For example, the memory can be random access memory (RAM) (e.g., dynamic random access memory (DRAM), resistive random access memory (RRAM), and/or phase change random access memory (PCRAM)), read-only memory (ROM) (e.g., electrically erasable programmable read-only memory (EEPROM) and/or compact-disk read-only memory (CD-ROM)), flash memory, a laser disk, a digital versatile disk (DVD) or other optical disk storage, and/or a magnetic medium such as magnetic cassettes, tapes, or disks, among other types of memory. Further, memory 332 can be located internal to smoke detector 302, or located internal to another computing resource (e.g., enabling computer readable instructions to be downloaded over the Internet or another wired or wireless connection).

Figure 4:
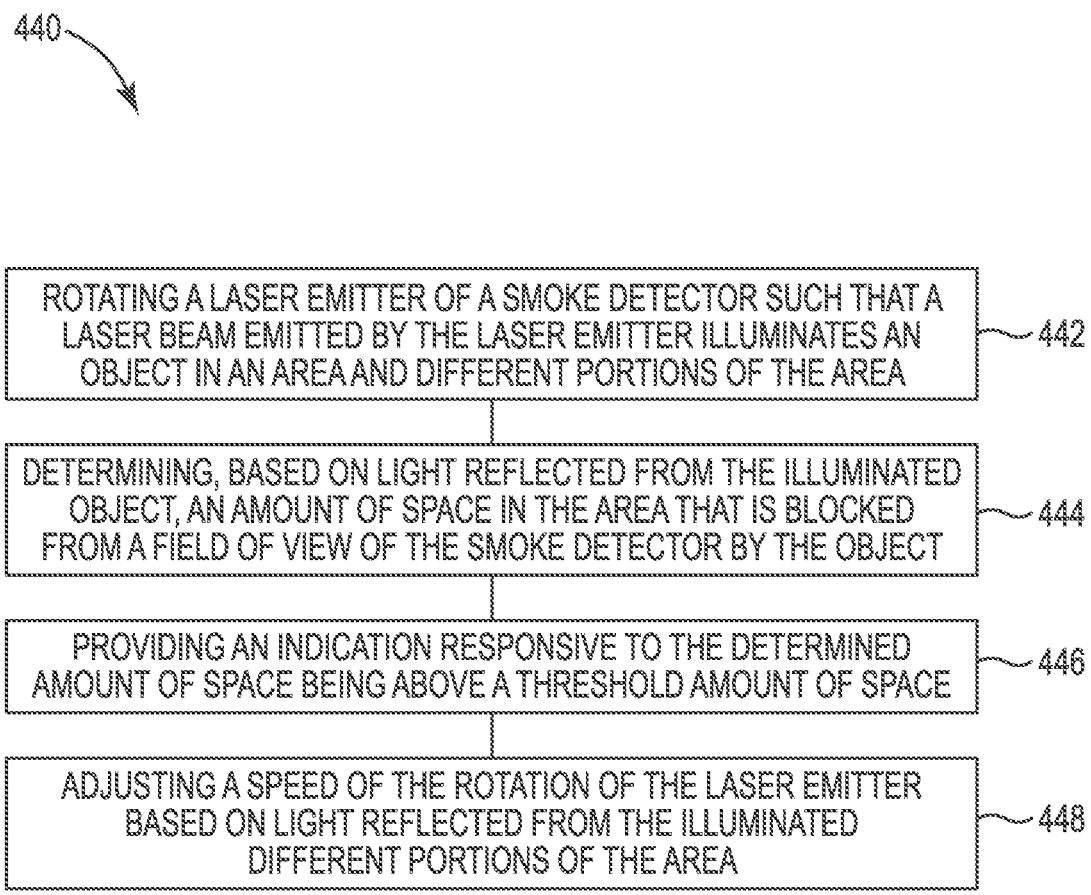
FIG. 4 is an example method of operating a smoke detector in accordance with one or more embodiments of the present disclosure.

FIG. 4 is an example method 440 of operating a smoke detector in accordance with one or more embodiments of the present disclosure. The smoke detector can be, for example, smoke detector 102, 202, and/or 302 previously described in connection with FIGS. 1, 2, and 3, respectively. The method can be performed and/or executed by, for example, controller 328 previously described in connection with FIG. 3.

At block 442, method 440 includes rotating a laser emitter of the smoke detector such that a laser beam emitted by the laser emitter illuminates an object in an area and different portions of the area. The laser emitter can be, for instance, laser emitter 322 previously described in connection with FIG. 3, and the laser beam emitted by the laser emitter can be, for instance, laser beam 106 and/or 206 previously described in connection with FIGS. 1 and 2, respectively. The laser emitter can be rotated using, for instance, rotation mechanism 326 previously described in connection with FIG. 3. The area can be, for instance, area 100 and/or 200 previously described in connection with FIGS. 1 and 2, respectively, the object can be, for instance, object 108 previously described in connection with FIG. 1, and the different portions of the area can comprise, for instance, different walls of the area, as previously described in connection with FIGS. 1 and 2.

At block 444, method 440 includes determining, based on light reflected from the illuminated object, an amount of space in the area blocked from a field of view of the smoke detector by the object. The amount of space blocked from the field of view of the smoke detector can correspond to, for instance, space 110 previously described in connection with FIG. 1, and can be determined, for instance, based on the intensity of the light reflected from the illuminated object, as previously described in connection with FIG. 1.

At block 446, method 440 includes providing an indication responsive to the determined amount of space being above a threshold amount of space. The threshold amount of space can be, for instance, defined or set based on the smoke detector operational requirements and/or fire codes of the local jurisdiction of the area, as previously described in connection with FIG. 1. The indication can be provided, for instance, to an additional device, as previously described in connection with FIG. 1.

At block 448, method 440 includes adjusting a speed of the rotation of the laser emitter based on light reflected from the illuminated different portions of the area. For instance, the speed of the rotation of the laser emitter can be adjusted based on the intensity of the light reflected from the illuminated different portions of the area, as previously described in connection with FIG. 2, and can be adjusted by adjusting the speed at which the rotation mechanism of the detector rotates the laser emitter of the detector, as previously described herein.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A smoke detector, comprising:
a laser emitter configured to emit a laser beam that illuminates an object in an area;
a light receiver configured to receive light reflected from the illuminated object; and
a controller configured to:
determine, based on an intensity of the light reflected from the illuminated object, an amount of space in the area that is blocked from a field of view of the smoke detector by the object; and
provide an indication responsive to the determined amount of space being above a threshold amount of space.

2. The smoke detector of claim 1, wherein:
the smoke detector includes a mechanism configured to rotate the laser emitter such that the laser beam illuminates different portions of the area;
the light receiver is configured to receive light reflected from the illuminated different portions of the area; and
the controller is configured to adjust a speed at which the mechanism rotates the laser emitter based on the light reflected from the illuminated different portions of the area.

3. The smoke detector of claim 1, wherein the controller is configured to:
determine a location of the object in the area based on the light reflected from the illuminated object; and
determine the amount of space in the area that is blocked from the field of view of the smoke detector by the object based on the determined location of the object in the area.

4. The smoke detector of claim 3, wherein the controller is configured to determine the location of the object in the area based on:
an alignment of the laser emitter when emitting the laser beam that illuminates the object; and
an amount of time for the light receiver to receive the light reflected from the illuminated object.

5. The smoke detector of claim 1, wherein the controller is configured to provide a different indication responsive to the determined amount of space not being above the threshold amount of space.

6. The smoke detector of claim 1, wherein:
the laser emitter is configured to emit a laser beam that illuminates an additional object in the area;
the light receiver is configured to receive light reflected from the illuminated additional object; and
the controller is configured to:
determine, based on the light reflected from the illuminated additional object, an amount of space in the area that is blocked from the field of view of the smoke detector by the additional object; and
provide an indication responsive to the determined amount of space in the area that is blocked from the field of view of the smoke detector by the additional object being above the threshold amount of space.

7. The smoke detector of claim 1, wherein the controller is configured to provide the indication to an additional device.

8. The smoke detector of claim 1, wherein the light receiver is a Light Detection and Ranging (LiDAR) receiver.

9. A smoke detector, comprising:
a laser emitter configured to emit a laser beam in an area;
a mechanism configured to rotate the laser emitter such that the laser beam illuminates different portions of the area;
a light receiver configured to receive light reflected from the illuminated different portions of the area; and
a controller configured to adjust a speed at which the mechanism rotates the laser emitter based on the light reflected from the illuminated different portions of the area.

10. The smoke detector of claim 9, wherein the controller is configured to adjust the speed at which the mechanism rotates the laser emitter based on an intensity of the light reflected from the illuminated different portions of the area.

11. The smoke detector of claim 9, wherein the controller is configured to:
determine a distance of each of the different portions of the area from the smoke detector based on the light reflected from the illuminated different portions of the area; and
adjust the speed at which the mechanism rotates the laser emitter based on the determined distance of each of the different portions of the area from the smoke detector.

12. The smoke detector of claim 11, wherein the controller is configured to adjust the speed at which the mechanism rotates the laser emitter such that an amount of time for which the laser beam illuminates each respective different portion of the area is directly proportional to the determined distance of that respective portion of the area from the smoke detector.

13. The smoke detector of claim 9, wherein the controller is configured to adjust an amount of time for which the laser beam illuminates each respective different portion of the area by adjusting the speed at which the mechanism rotates the laser emitter.

14. The smoke detector of claim 9, wherein the controller is configured to adjust the speed at which the mechanism rotates the laser emitter to a speed sufficient to detect smoke in each of the different portions of the area while the laser beam illuminates each of the different portions of the area within a particular amount of time.

15. A non-transitory computer readable medium having computer readable instructions stored thereon that are executable by a processor to:
rotate a laser emitter of a smoke detector such that a laser beam emitted by the laser emitter illuminates an object in an area and different portions of the area;
determine, based on light reflected from the illuminated object, an amount of space in the area that is blocked from a field of view of the smoke detector by the object;
provide an indication responsive to the determined amount of space being above a threshold amount of space; and
adjust a speed of the rotation of the laser emitter based on light reflected from the illuminated different portions of the area.

16. The computer readable medium of claim 15, wherein the instructions are executable by the processor to:

determine a shape of the area based on the light reflected from the illuminated different portions of the area; and determine the amount of space in the area that is blocked from the field of view of the smoke detector by the object based on the determined shape of the area.

17. The computer readable medium of claim 15, wherein the laser beam emitted by the laser emitter is a pulsed laser beam.

18. The computer readable medium of claim 15, wherein the different portions of the area comprise different walls of the area.

19. The computer readable medium of claim 15, wherein the laser emitter is a laser diode.

* * * * *